United States Patent Office 2,804,481
Patented Aug. 27, 1957

2,804,481

DICYCLOHEXYL ALKYL PHENOLS

Herbert B. Rickert, Midland, Mich., assignor to The Dow Chemical Company, Midland, Mich., a corporation of Delaware No Drawing. Application May 11, 1955,
Serial No. 507,746

5 Claims. (Cl. 260—619)

The present invention is concerned with the 2,6-dicyclohexyl-4-alkyl phenols of the following formula

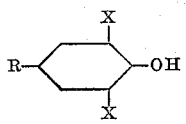

In this and succeeding formulae X represents cyclohexyl and R represents an alkyl radical containing from 2 to 5 carbon atoms, inclusive. These novel compounds are viscous liquids or crystalline solids which are somewhat soluble in many organic solvents and of very low solubility in water. They have been found to be particularly valuable as parasiticides and are adapted to be employed as active toxic constituents of compositions for the control of Southern army worms and Mexican bean beetles.

The new, 2,6-dicyclohexyl-4-alkyl phenols may be prepared by mixing or blending cyclohexene or other suitable source materials capable of yielding cyclohexene, such as cyclohexanol, with an alkyl phenol of the formula

The reaction is carried out in the presence of a condensation catalyst such as sulfuric acid, hydrochloric acid, phosphoric acid, zinc chloride, aluminum chloride, an acid activated clay or a cation exchange resin in the acid form. Good results are obtained when employing at least two molecular proportions of cyclohexene with each molecular proportion of alkyl phenol and an amount of catalyst equal to from 1 to 10 percent by weight of the phenol. The reaction takes place smoothly at temperatures of from 140° to 200° C. Temperatures substantially below 140° C. materially affect the course of the reaction and should not be employed for any appreciable period of time if it is desired to obtain the 2,6-dicyclohexyl-4-alkyl phenols as a major product of reaction.

In carrying out the reaction, the alkyl phenol and catalyst are mixed together and the cyclohexene or cyclohexene-yielding material added portionwise thereto. During the addition, which is carried out with stirring, the reaction mixture is maintained at a temperature of from 140° to 200° C. Following the reaction, the reaction mixture may be filtered and the filtrate successively washed with dilute aqueous alkali metal hydroxide and water. The washed filtrate is then fractionally distilled under reduced pressure to separate the desired product.

The following examples illustrate the invention but are not to be construed as limiting:

Example 1

97 grams (0.79 mole) of p-ethyl phenol, 10 grams of a sulfuric acid activated bentonite (Retrol clay) and one milliliter of aqueous 20 percent sulfuric acid were charged into a flask and a mixture of 158 grams (1.58 moles) of cyclohexanol (equivalent to 1.58 moles of cyclohexene) and 2 milliliters of aqueous 20 percent sulfuric acid added portionwise thereto with stirring and at a temperature of from 154° to 165° C. The addition was carried out over a period of 35 minutes and with continuous distillation of formed cyclohexene and water, separation of the water and recycling of the cyclohexene. Following the addition the mixture was maintained for 0.5 hour at a temperature of from 154° to 165° C. to complete the reaction. The reaction mixture was thereafter cooled to 80° C., filtered and the filtrate diluted with 15 milliliters of aqueous 10 percent sodium hydroxide. The latter product was thereafter fractionally distilled under reduced pressure to separate a 2,6-dicyclohexyl-4-ethyl phenol product as a viscous liquid boiling at 151°–159° C. at 0.1 millimeter pressure and having a specific gravity of 1.0012 and a refractive index $n/D$ of 1.5360 at 45° C.

Example 2

Eighteen milliliters of aqueous 20 percent sulfuric acid was mixed with 1624 grams (16.24 moles) of cyclohexanol and the resulting product added portionwise with stirring to a mixture of 1105 grams (8.12 moles) of p-isopropyl phenol, 100 grams of Retrol clay and 12 milliliters of aqueous 20 percent sulfuric acid. The addition was carried out over a period of 3.5 hours and with continuous distillation of formed cyclohexene and water, separation of the water and recycling of the cyclohexene. During the addition, the reaction mixture was maintained at a temperature of from 158° to 169° C. The reaction mixture was thereafter cooled to 110° C., filtered and the filtrate diluted with 100 milliliters of aqueous 10 percent sodium hydroxide. The diluted filtrate was then fractionally distilled under reduced pressure to separate a 2,6-dicyclohexyl-4-isopropyl phenol product as a viscous liquid boiling at from 178.5° to 184° C. at from 0.9 to 1.1 millimeters pressure and having a specific gravity of 0.9958 and a refractive index $n/D$ of 1.5370 at 45° C.

Example 3

300 grams (2 moles) of p-secondarybutyl phenol, 15 grams of Retrol clay and 3 milliliters of aqueous 20 percent sulfuric acid were charged into a flask and 442 grams (4.42 moles) of cyclohexanol added portionwise thereto with stirring and at a temperature of from about 153° to 170° C. The addition was carried out over a period of 2 hours and with continuous distillation of formed cyclohexene and water, separation of the water and recycling of the cyclohexene. The reaction mixture was thereafter cooled to 97° C., filtered and the filtrate fractionally distilled under reduced pressure to separate a 2,6-dicyclohexyl-4-secondarybutyl phenol product as a viscous liquid boiling at 213°–213.5° C. at 3 millimeters pressure.

Example 4

328 grams (2 moles) of p-secondaryamyl phenol, 33 grams of Retrol clay and 3 milliliters of aqueous 20 percent sulfuric acid were charged into a flask and a mixture comprising 400 grams (4 moles) of cyclohexanol and 5 milliliters of aqueous 20 percent sulfuric acid added portionwise thereto with stirring and at a temperature of from 154° to 166° C. The addition was carried out over a period of about one hour and with continuous distillation of formed cyclohexene and water, separation of the water and recycling of the cyclohexene. Following the addition the mixture was heated for a short period of time at a temperature of from 154° to 165° C. to complete the reaction. The reaction mixture was then cooled to room temperature, filtered and the filtrate diluted with 30 milliliters of aqueous 10 percent sodium hydroxide. The latter product was thereafter fractionally distilled under reduced pressure to separate a 2,6-dicyclohexyl-4-secondaryamyl phenol boiling at 175.5°–178.5° C. at 0.6 millimeter pressure and having a specific gravity of 1.0027 and a refractive index $n/D$ of 1.5308 at 25° C.

*Example 5*

Two moles of p-normalbutyl phenol and 4 moles of cyclohexanol are reacted together in the manner as described in Example 4 to obtain a 2,6-dicyclohexyl-4-normalbutyl phenol product as a viscous liquid.

The products of the preceding examples are adapted to be applied to plants for the control of Southern army worms and Mexican bean beetles. In operations against Southern army worms, applications to plant foliage of aqueous spray compositions containing one pound of the toxicants per 100 gallons of ultimate mixture gives 100 percent kills of this organism.

I claim:
1. A 2,6-dicyclohexyl-4-alkyl phenol of the formula

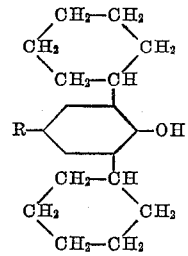

wherein R represents an alkyl radical containing from 2 to 5 carbon atoms, inclusive.
2. 2,6-dicyclohexyl-4-isopropyl phenol.
3. 2,6-dicyclohexyl-4-secondarybutyl phenol.
4. 2,6-dicyclohexyl-4-secondaryamyl phenol.
5. 2,6-dicyclohexyl-4-ethyl phenol.

References Cited in the file of this patent

Skraup et al.: Berichte Deut. Chem., vol. 60B (1927), pp. 1070–4 (5 pp.).